C. ACKERBERG.
MEANS FOR SECURING ANTISKID CHAINS TO VEHICLE WHEELS.
APPLICATION FILED MAR. 24, 1920.
1,424,971.
Patented Aug. 8, 1922.
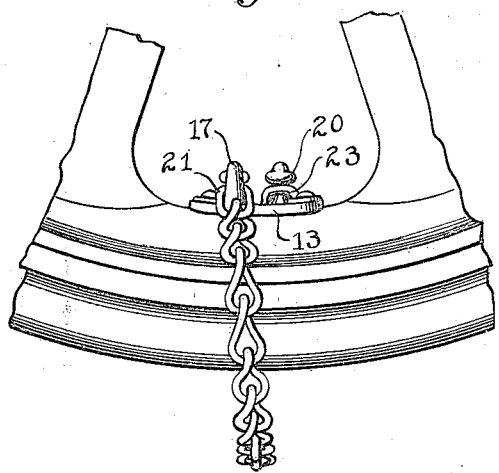
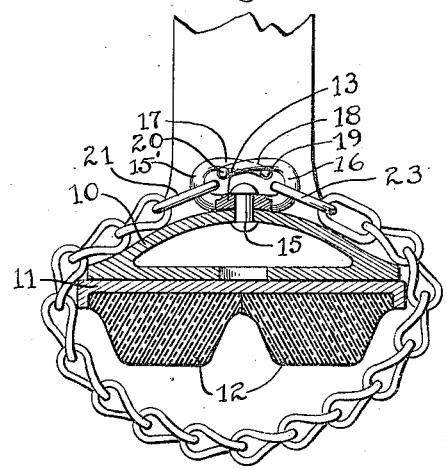
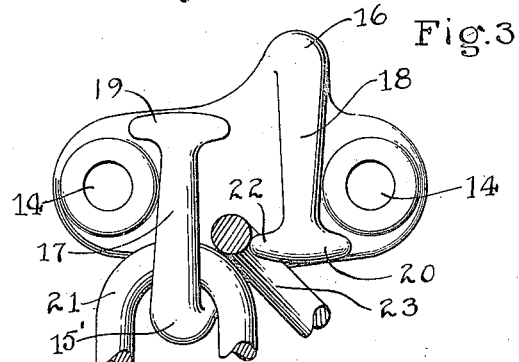
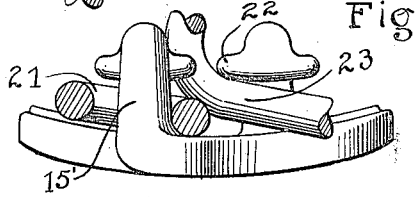
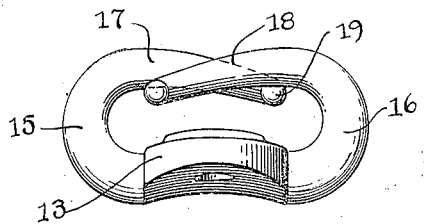
Inventor
Carl Ackerberg
Williams, Bradbury &c
Attorneys.

UNITED STATES PATENT OFFICE.

CARL ACKERBERG, OF OSHKOSH, WISCONSIN, ASSIGNOR TO CHALLONER COMPANY, OF OSHKOSH, WISCONSIN, A CORPORATION OF WISCONSIN.

MEANS FOR SECURING ANTISKID CHAINS TO VEHICLE WHEELS.

1,424,971.     Specification of Letters Patent.     Patented Aug. 8, 1922.

Application filed March 24, 1920. Serial No. 368,449.

*To all whom it may concern:*

Be it known that I, CARL ACKERBERG, a citizen of the United States, and resident of Oshkosh, in the county of Winnebago and State of Wisconsin, have invented a certain new and useful Improvement in Means for Securing Antiskid Chains to Vehicle Wheels, of which the following is a full, clear, concise, and exact description, reference being had to the accompanying drawings, forming a part of this specification.

My invention relates to improvements in means for securing anti-skid chains to vehicle wheels and the method of making same. The objects of my invention are:

First. To provide means for securing anti-skid chains to wheels, comprising a pair of hooks and means for securing the hooks to a vehicle wheel, so that the shanks thereof extend transversely of the wheel, and in spaced parallel overlapping relation, with the shanks of the two hooks extending in opposite directions, whereby slack in the chain will be distributed between the two hooks, thereby tending to prevent the ends of the chain from becoming detached from the hooks;

Second. To provide means of the character described, comprising a pair of hooks so disposed relatively to each other that when an anti-skid chain is engaged with the bight of one hook, an adjacent portion of the other hook will prevent the other end of the anti-skid chain from being detached from the other hook;

Third. To provide a device of the character described, comprising two hooks so located relatively to the wheel as to be protected from contact with curbs and other obstacles, and tending to prevent the chain from becoming entangled in the brake mechanism or in the chain driving gear in the event the anti-skid chain becomes broken; and Fourth. To provide a device of the character described, which is economical to manufacture and easy to operate.

Other objects will appear as this description progresses, reference being had to the accompanying drawings, in which Figure 1 is a side elevation of a portion of a metal wheel, showing my improved device in use for connecting an anti-skid chain to the wheel;

Figure 2 is a transverse section through a metal wheel, equipped with my improved means;

Figure 3 is a plan view of my improved device and portions of two chain links, showing how the ends of an anti-skid chain are locked to the device;

Figure 4 is a side elevation of the construction shown in Figure 3;

Figure 5 is an end view of the construction shown in Figure 3, with the links removed; and Figure 6 is a plan view of a blank illustrating the method by which I form my improved device.

Throughout the several views similar reference characters will be used for referring to similar parts.

Referring to the drawings, the reference character 10 indicates the hollow felly of a metal wheel, which is equipped with a rim 11 and a double tire 12. The details of the wheel construction are merely illustrative, and form no part of my present invention.

My improved device for securing anti-skid chains to a vehicle wheel comprises a plate 13, which is curved both longitudinally and transversely to conform to the contour of the inner side of the felly 10, and provided with openings 14, for receiving rivets 15, or other suitable devices, whereby the plate may be secured to the felly. Formed integral with the plate are two hooks, the bights 15 and 16 of which are formed integral with the opposite sides of the plate 13, and the shanks 17 and 18 of which extend in spaced parallel overlapping relation across the plate in opposite directions. The free ends of the shanks 17 and 18 are each provided with a crosshead 19 and 20, respectively, extending in a plane substantially parallel with the plane of the plate 13. From an inspection of Figure 6 it will be noted that the free ends of the shanks are bent downwardly toward the plate. It will also be noted from an inspection of Figure 3 that the bight of each hook extends outwardly beyond the crosshead of the adjacent hook. This construction permits easier manipulation of the links of the auto-skid chain over the crossheads than would be the case if the crossheads occupied a position immediately adjacent the bights of the respective hooks.

While I do not wish to limit my invention to any particular spacing of the two hooks relatively to each other, it will be noted from an inspection of Figures 3 and 4 that I have provided means whereby there is a tendency for one end of the chain to lock the other end of the chain to its hook, and thereby prevent accidental detachment of the chain, and especially so in the event the chain becomes broken or worn through. It will be noted from an inspection of these figures that with the link 21 in the bight 15, the space between the end portion 22 of the crosshead 20 and the adjacent portion of the link 21 is too small to permit the link 23 to pass therethrough. This does not, however, prevent either end of the chain from being detached from its hook, for it will be seen that when, say, for instance, the link 21 is shifted so as to be brought into contact with the shank 17 at a point intermediate its ends, there will be plenty of room for the link 23 to be passed over the crosshead 20 and between it and the bight 15 of the other hook. It will of course be clear that if the diameter of the stock from which the chain links are made is reduced or if the spacing between adjacent portions of the hooks is increased, this locking function will disappear to a greater or a lesser extent, but there will nevertheless, with practically any desired spacing of the hooks, be more or less interference between the ends of the chain as they move first in one direction and then in the other to prevent any accidental detachment of the chain from the hooks, even though the chain becomes broken; for it will be noted that, by the use of the crosshead, I have provided means which makes it necessary to bring the link of the chain which is engaged with any one of the hooks into a certain predetermined position before it can be detached therefrom, and it is highly unlikely that with the interference which does exist between the two ends of the chain the end link should accidentally attain this position.

In forming my improved device the metal is first broken down to prepare it for the forming die. The metal is then subjected to the forming dies, which results in a blank similar to that shown in Figure 6, in which the shanks 17 and 18 lie substantially in the plane of the plate 13. At this stage in the process, the openings 14 have not been formed. The blank is then punched to form these openings, and the plate 13 is then bent to conform to that portion of the wheel felly to which it is to be attached.

The next step in the process is to bend the shanks 17 and 18 up out of the plane of the plate 13, around substantially the axes $x$—$x$. This brings the cross heads 19 and 20, which previously extended at right angles to the plane of the plate 13, into substantial parallelism therewith, and the free ends of the shanks 17 and 18 are then depressed slightly toward the plate 13, as shown in Figure 6. By this method of manufacture, I am enabled to reduce considerably the amount of stock required for forming one of these devices, which would be required by ordinary methods of forging.

While I have described the details of the preferred embodiment of my invention and the method of making the same, it is to be clearly understood that my invention is not limited to these details, but is capable of other adaptations and modifications within the scope of the appended claims.

Having thus described my invention, what I claim is:

1. Means for securing an anti-skid chain to a vehicle wheel, comprising a plate having a hook at each side thereof, the bights of said hooks being formed integral with said plate and the shanks of said hook extending in opposite directions in spaced substantially parallel overlapping relation, and crossheads secured to the free ends of said shanks and each lying in a plane substantially parallel to the plane of said plate, the bight of each hook lying outwardly beyond the crosshead of the adjacent hook.

2. Means for securing an anti-skid chain to a vehicle wheel, comprising a plate having a hook at each side thereof, the bights of said hooks being formed integral with said plate and the shanks of said hook extending in opposite directions in spaced substantially parallel overlapping relation, and crossheads secured to the free ends of said shanks and each lying in a plane substantially parallel to the plane of said plate.

3. Means for securing an anti-skid chain to a vehicle wheel, comprising a plate having a hook at each side thereof, the bights of said hooks being formed integral with said plate and the shanks of said hook extending in opposite directions in spaced substantially parallel overlapping relation.

4. The combination with a vehicle wheel, of a plate, means for securing said plate to a wheel, a hook at each side of said plate, formed integral therewith, the shanks of said hooks extending in opposite directions in spaced parallel relation, and provided at their free ends with crossheads, and an anti-skid chain having one end engaged over one of said hooks and the other end engaged over the other hook, the space between each crosshead and the adjacent portion of the other hook being less than the combined diameters of the links of said chain engaged with said hooks.

5. The combination with a vehicle wheel, of a plate, means for securing said plate to a wheel, a hook at each side of said plate, formed integral therewith, the shanks of said hooks extending in opposite directions in spaced parallel relation, and an anti-skid chain having one end engaged over one of said hooks and the other end engaged over the other hook, the space between said hooks at one end being less than the combined diameters of the links of said chains engaged with said hooks, and the space between said hooks at any other point being greater than the combined diameters of the links of said chain engaged with said hooks.

6. In combination with a wheel, a hook with its base on one side of the inner surface of the wheel and its length across the rim thereof, another hook parallel to the first hook with its base located diagonally opposite the first hook, the bodies of said hooks being projected in opposite directions parallel to one another and spaced apart, with the heads of said hooks having their free ends overlapping.

7. The combination with a wheel, of a base on the inner side of the rim of said wheel, a pair of hooks with their bases diagonally opposite to one another and their free ends overlapping, located on said base substantially parallel to one another, means co-operating with said hooks to prevent a chain from slipping off said hooks.

8. In a wheel, the combination of a detachable base located on the inside of the rim thereof, a pair of hooks having their free ends located parallel to one another projected in opposite directions and overlapping, with the bases of said hooks located diagonally opposite on said detachable base.

9. In combination with a wheel, a detachable base on the inside of the rim of said wheel curved longitudinally and transversely so as to conform thereto, a pair of hooks adjacent to and parallel with one another located upon said base, their bodies projecting in opposite directions and on a line at an angle to the main axis of the hub, their free ends overlapping and chain retaining knobs on said free ends.

In witness whereof, I hereunto subscribe my name this 19th day of March, 1920.

CARL ACKERBERG.

Witnesses:
H. B. Osgood,
W. A. Harmon.